April 23, 1957 G. F. JANAUSHEK 2,789,643

CARD PUNCHING MACHINE

Filed Oct. 4, 1954 4 Sheets-Sheet 1

INVENTOR.
GEORGE F. JANAUSHEK

BY G. R. Gugger
AGENT

INVENTOR.
GEORGE F. JANAUSHEK
BY
G. R. Gugger
AGENT

April 23, 1957 G. F. JANAUSHEK 2,789,643

CARD PUNCHING MACHINE

Filed Oct. 4, 1954 4 Sheets-Sheet 3

INVENTOR.
GEORGE F. JANAUSHEK

BY

G. R. Gugger
AGENT

April 23, 1957 G. F. JANAUSHEK 2,789,643

CARD PUNCHING MACHINE

Filed Oct. 4, 1954 4 Sheets-Sheet 4

INVENTOR.
GEORGE F. JANAUSHEK

BY

G. R. Gugger

AGENT 2,789,643
Patented Apr. 23, 1957

2,789,643

CARD PUNCHING MACHINE

George F. Janaushek, Vestal, N. Y., assignor to International Business Machines Corporation, New York, N. Y., a corporation of New York Application October 4, 1954, Serial No. 460,148

5 Claims. (Cl. 164—115)

Figure 1:
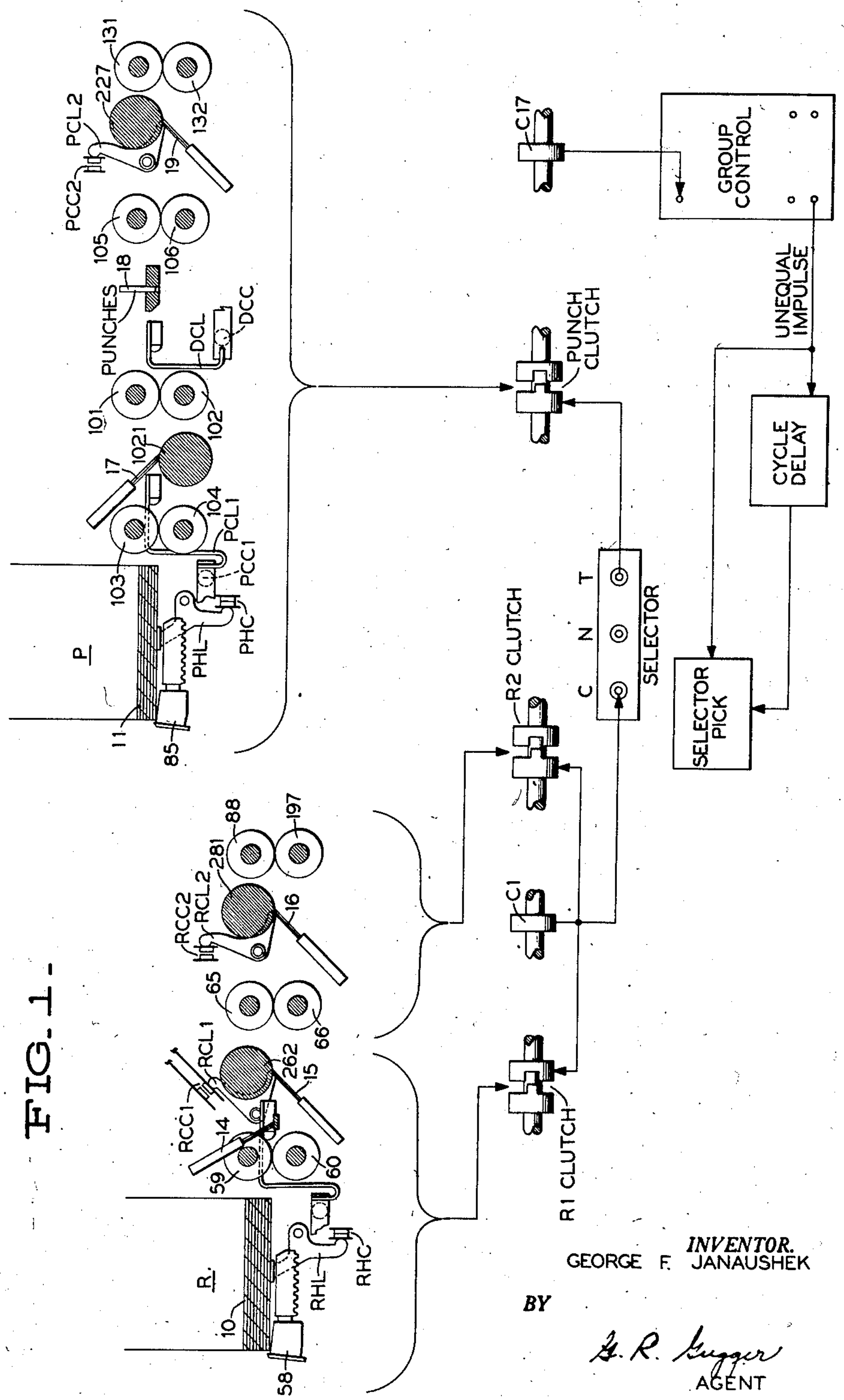

This invention relates to devices for perforating record cards. More specifically the invention is concerned with improved devices for reproducing record cards under control of other perforated cards.

An object of the invention is to provide an improved arrangement which provides for the analysis of different control groups of master cards and the transfer of data from certain master cards in each control group to detail cards.

Another object of the invention is to provide means for distinguishing between different control number perforations associated with different groups of master cards and means for selectively reproducing data in the first, second or both master cards of each group into detail cards.

A still further object of the invention is to devise group control devices and class selection devices arranged for selectively controlling the card feeding and punching devices of the machine to carry out the selective reproducing of the first, second or both master cards of each control group.

The present invention is particularly useful in card controlled accounting systems which may involve a large file of different groups of master cards wherein the first and second master cards of each group may contain name and address data while the remaining cards in each group may contain other data to be used for accounting purposes. It may be desired to prepare a report which requires the use of only data from the name and address master cards of said master card file and, if such be the case, it is particularly advantageous to selectively reproduce the first and second name and address cards of each master card group into detail cards thereby leaving the master card file intact and eliminating the necessity of separating the name and address master cards from the rest of the master card file.

In the illustrative embodiment of the invention the control number perforated in the first master card of a group is read at the first reading brushes 15 and entered into the group control devices. Since at this point there is no card at the second reading brushes 16, the group control devices will transmit an unequal impulse which is directed to a class selection device. The class selection device serves to transmit said impulse later in the cycle to the punch clutch of the machine to initiate card feeding and operation of the punch unit to reproduce the data on the first master card into a detail card.

To selectively reproduce the second master card of the group the same unequal impulse is used to energize a delay relay. The delay relay causes said class selection device to operate a second time and at an appropriate time in the cycle following the reproducing of the first master card the class selection device will automatically transmit another impulse to the punch clutch to again initiate card feeding and operation of the punch unit to reproduce the data on the second master card into a detail card.

The above example brings out a mode of operation of the machine which features the selective reproduction of the first two cards of a control group, the structure for accomplishing this result distinguishing over prior punching machines which are capable of selectively reproducing only the first card of a control group.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a diagrammatic view showing the particular card feeding mechanism associated with each of the selectively engaged clutches of the punching machine and the manner in which the mode of operation of the machine is controlled by the group control and the class selection devices.

Figure 2A:
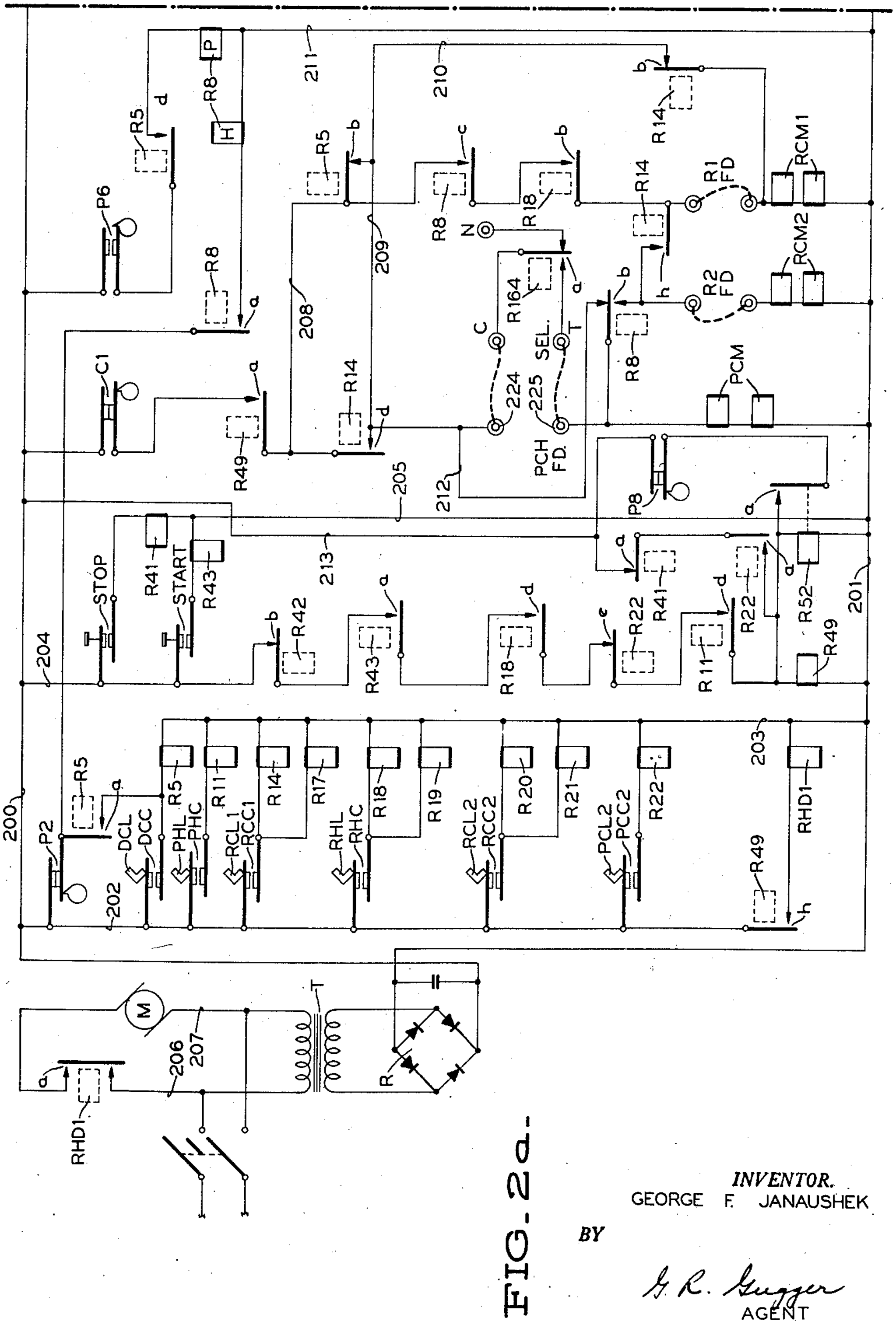
Figure 2B:
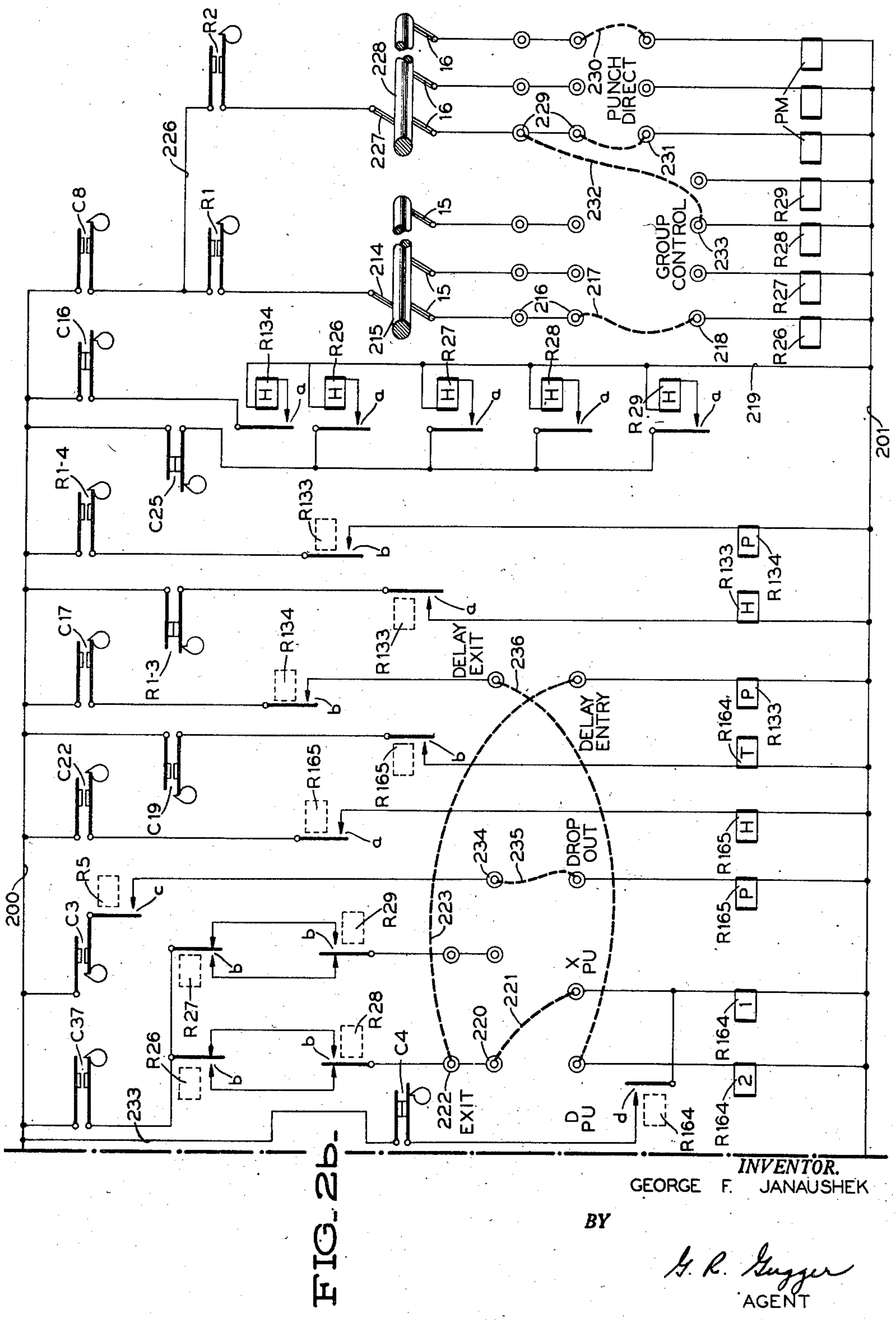

Figs. 2*a* and 2*b* taken together form a wiring diagram of the machine.

Figure 3:
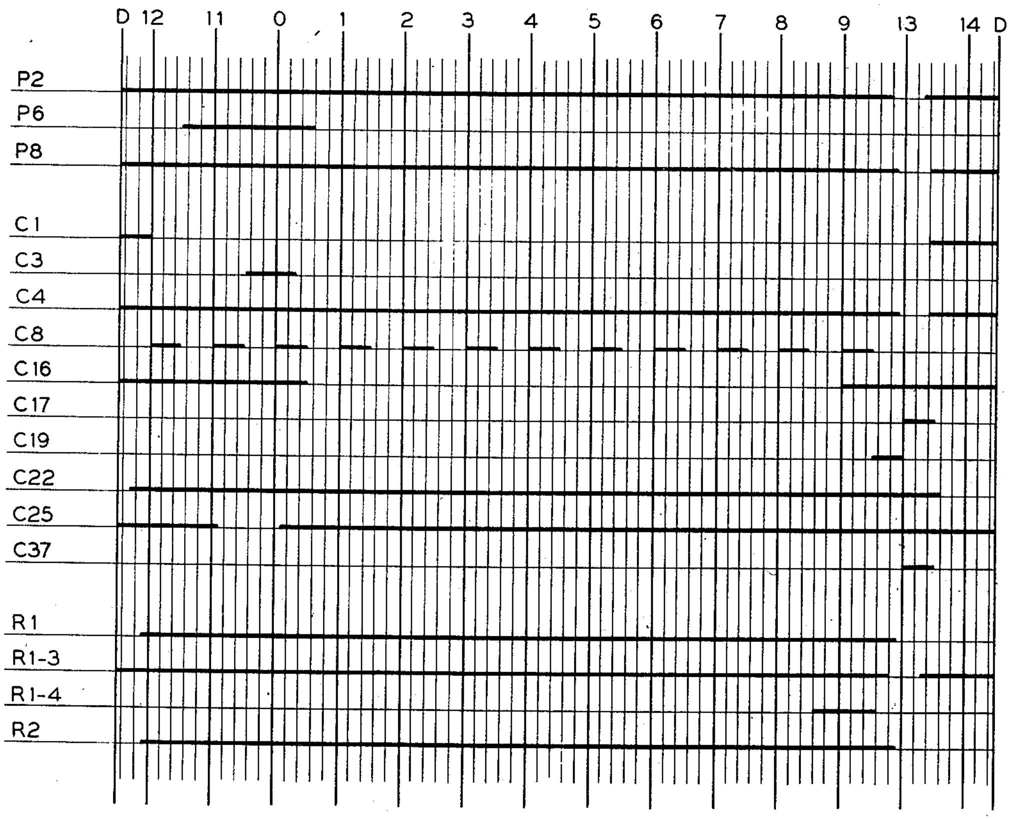

Fig. 3 is a timing diagram showing the timing of the cam operated contacts.

The present improvements are preferably incorporated in the form of card perforating machine fully shown and described in the Patent 2,372,909 to R. E. Page et al., dated April 3, 1945.

Such a card perforating machine is known in the art as the IBM Reproducing Punch and its structure is so well known that it is deemed repetitious and unnecessary to repeat herein the complete description of the mechanical structure of the machine. Accordingly, in the following description, only a brief description will be given of the construction and operation of the machine as far as it pertains to the present invention.

To obtain further details of construction and operation of the illustrative machine, reference may be had to the afore-mentioned patent.

GENERAL OPERATIONS OF MACHINE

A general idea of the operation of the devices of the present invention may be gathered by observing the diagrammatic view shown in Fig. 1. There it is noted that there are a number of pattern cards 10 in the hopper R and another bunch of blank record cards 11 in the hopper P. The cards are fed singly but concurrently from both hoppers and are then shifted in synchronism across sensing and punching stations before being deposited in stackers.

The various feeding devices encompassed by the three different clutches are diagrammatically shown, wherein it will be seen that the engagement of the R1 clutch causes the operation of the picker knife 58, the feeding rollers 59 and 60 and contact roller 262. The R2 clutch when engaged causes operation of the feeding rollers 65—66 and 88—197 and contact roller 281. The P clutch on the other hand, when engaged, causes the operation of the picker knife 85 and the concomitant rotation of the four sets of feeding rollers 103—104, 101—102, 105—106 and 131—132 and contact rollers 227.

The pattern card 10 encounters first a master sensing brush 14, then a set or line of sensing brushes 15, and then a series of checking brushes 16. The record card 11 passes a master brush 17, then a line of punches 18 and then the set of checking brushes 19.

The brush 14 cooperates with a special perforation position on the original or pattern card 10 and when such a perforation is sensed a class selection operation may take place to shift the sensed data to a selected field on the record card. The brush 17 is used for field selection of gang punching and also for control of suspension of pattern card feeding when operating for combined gang punching and reproducing.

There are electrical connections between the brushes 15 and the punches 18, so that when a perforation is sensed in a pattern card 10 a corresponding perforation is punched in the related record card 11.

As the cards pass the first sensing and punching stations, they enter the checking sensing stations. The pattern card 10 is sensed by checking brushes 16 at the same time that the related record card 11 is sensed by checking brushes 19. If the perforations in both do not agree, the machine is stopped and a lamp lights to indicate the error to the operator.

Before starting the operation of the machine, the master and detail cards are placed in the M and D hoppers respectively and the cards are inserted with the printed face down and with the leading edge of the card adjacent to the twelve index point positions. The start key is then depressed and at the beginning of the operation of the machine the R1, R2 and P clutches will be concurrently engaged and by the end of the first feeding cycle the bottom master and detail cards will be fed from each of the hoppers M and D, the first master card stopping at the first reading brushes 15 and the first blank detail card stopping at the punch brushes 17. During the second feed cycle the R1 and R2 clutches are rendered inactive and only the P clutch is active. As a result, at the end of the second cycle the first master card is still at the first reading brushes 15 while the first blank detail card is between the punches 18 and the punch checking brushes 19 and a second blank detail card is fed out of the hopper D and positioned at the punch brushes 17.

On the third cycle the R1 and R2 clutches are rendered active for the remainder of machine operation while the P clutch becomes normally inactive unless it is signaled to operate. During the third cycle the control number in the first master card will be analyzed by the first reading brushes 15 and group control relays will be set up. Other group control relays are electrically associated with the second reading brushes 16 and these relays are set up when a master card is analyzed by the brushes 16. By the particular contacts closed by such relays, a comparison of the group control data can be made by an electrical circuit to determine whether the control data on one master card is equal to the control data on another master card or if they disagree.

Thus, if during the third cycle the group control comparison determines a disagreement between master cards at brushes 15 and 16 or there is a master card at the first brushes 15 and no card at the second brushes 16 a class selection relay will be energized and contacts associated with a class selection device will transfer. The transfer of the class selection contacts will cause the energization of the P clutch and detail cards will feed during the fourth cycle. The group control disagreement in the third cycle will also cause the energization of a delay relay which holds over into the fourth cycle.

During the fourth cycle, the first master card passes the second reading brushes and reproduces into a detail card passing the punches 18. Also, a second master card feeds to the first reading brushes 15 and the group control number thereon is compared against the number on the first master card at the second brushes 16. Since the cards are the first and second master cards of the same control group there is an equal comparison. During the fourth cycle the class selection device transfers back to normal and a second delay relay is energized. Near the end of the fourth cycle contacts of the second delay relay condition a delay exit circuit to effect a second energization of the class selection relay and the class selection contacts transfer again to cause the energization of the P clutch and detail cards will again feed during the fifth cycle.

During the fifth cycle, the second master card passes the second reading brushes and reproduces into a new detail card passing the punches 18. The third master card feeds to the first reading brushes 15 and compares equal with the second master card at the second reading brushes. As a result of the equal comparison only the R1 and R2 clutches are energized to feed master cards in cycle six. Master cards will continue to feed while the P clutch remains inactive until a new control group is encountered and an unequal comparison of control numbers occurs. Hence, the first and second master card of each control group will be selectively reproduced. If it is desired to selectively reproduce only the first master card of each group, it is only necessary to disconnect the delay circuitry from the group comparing circuits.

OPERATION OF MACHINE IN CONNECTION WITH WIRING DIAGRAM

*First cycle*

Referring to Fig. 2*a*, when the main switch is closed 110 volts A. C. is applied across the transformer T and rectifier R to provide a source of 40 volts D. C. across the two main lines 200 and 201 of the machine. Blank cards are inserted in the feed hopper P and the original or master cards are placed in the hopper R. The cards in hoppers P and R operate the respective hopper levers PHL and RHL, closing contacts PHC and RHC, and energizing relays R11 and R18 by a circuit which extends from line 200, wire 202, contacts PHC and RHC, relays R11 and R18, wire 203 and line 201. Now the start key is depressed to complete a circuit from line 200, wire 204, the start key, relay R43, wire 205 and line 201. Energization of relay R43 closes contacts R43*a* and completes a circuit from line 200, wire 204, normally closed contacts R42*b*, normally open contacts R43*a*, now transferred, contacts R18*d*, now transferred, normally closed contacts R22*e*, contacts R11*d*, now transferred, the pick coil of relay R49 and line 201.

Upon energization of relay R49, a circuit is completed from line 200, wire 202, contacts R49*h*, now transferred, motor relay RHD1 and line 201. The energization of the motor relay RHD1 closes contacts RHD1*a* and operates motor M through the 110 volt lines 206 and 207. Also a circuit is completed to the punch clutch magnet PCM and the read clutch magnet RCM1. This circuit extends from line 200, cam contacts C1, contacts R49*a* now closed, wire 208, the normally closed contacts R5*b*, wire 209, the normally closed side of contacts 8*b*, punch clutch magnet PCM and line 201 and also from the R49*a* contacts, the normally closed contacts R5*b*, wire 210, normally closed contacts R14*b*, the RCM1 clutch magnet and line 201. Through the clutch connections thus made, the punch picker is operated to feed the first detail card out of the hopper and between the first set of feed rolls 103, 104 and the read picker is operated to feed the first master card out of the hopper and between the first set of feed rollers 59, 60.

At approximately 7 time in the first cycle the first master card and the first detail card will have advanced a sufficient amount to close their respective card levers RCL1 and DCL and a circuit will be completed from line 200, wire 202, die card lever contacts DCC and the read card lever contacts RCC1, the pick coils of relays R5 and R14, wire 203 and line 201. The energization of relays R5 and R14 serve to energize the punch feed unit to feed detail cards in the second cycle and also to suspend feeding of master cards in the read feed unit during the second cycle. With the transfer of contacts R5*b*, the circuit to the read clutch magnet RCM1 must pass through the R8*c* contacts and the R18*b* contacts. However, at 13.4 time in the first cycle the contacts R8*c* are still open and consequently the circuit impulse from the cam contacts C1 cannot get through to the read clutch magnet RCM1 and the read feed unit will remain idle during the second cycle. The circuit impulse from C1 can, however, pass through the contacts R49*a*, now closed, the transferred contacts R14*d*, wire 212, the normally closed side of contacts R8*b*, the punch clutch magnets PCM and line 201. As a result the punch feed unit operates to feed detail cards during the second cycle.

*Second cycle*

The second cycle is used to advance the first detail card in the punch unit past the punches and a second detail card moves to the punches while the read unit remains idle. At 12.5 time in the second cycle a circuit is completed from line 200, cam contacts P6, contacts R5*d*, now closed, the pick coil of relay R8, wire 211 and line 201. As was previously stated, in the first cycle the first master card will have reached and closed the RCL1 card lever and a circuit was completed from line 200, wire 202, the RCC1 contacts, the pick coil of relay R14, wire 203 and line 201. The energization of relay R14 closes contacts R14*h* to establish a continuous electrical connection between the read clutch magnets RCM1 and RCM2 and hereafter whenever clutch magnets RCM1 are energized, clutch magnets RCM2 will be simultaneously energized for concurrent operation.

The energization of relay R8 closes contacts R8*c* and as a result a circuit is completed each cycle to continuously operate the read feed after the second cycle. This circuit extends from line 200, cam contacts C1, closed contacts R49*a*, wire 208, contacts R8*c*, now closed, closed contacts R18*b*, plug wire connection between the R1 FD hubs, the clutch magnet RCM1 and line 201. The circuit also extends through the now closed contacts R14*h*, the plug wire connection between the R2 FD hubs, the clutch magnet RCM2 and line 201. In the case of the punch clutch magnets PCM, contacts R8*b* are now transferred and the only circuit that can be completed to the magnets PCM must extend through the PCH FD hubs and the normally open selector relay contacts R164*a*. Hence, after the second cycle the punch feed is selectively operated by energizing the selector relay R164 as will be described.

When relay R49 was energized at the start of the first cycle through the depression of the start key, a motor relay R52 was energized along with R49 and these two relays will remain energized until approximately 9.9 time of the first cycle through a circuit which extends from line 200, wire 213, cam contacts P8, the now closed contacts R52*a*, the relay coils R49, R52 and line 201. To prevent relay R49 from dropping out near the end of the first cycle, the start key is held for the second cycle until the first detail card arrives at the punch brush station where it operates the punch card lever PCL2 to complete a circuit from line 200, wire 202, contacts PCC2, now closed, the pick coil of relay R22, wire 203 and line 201. Energization of relay R22 completes a hold circuit for relay R49 which extends from line 200, wire 213, the normally closed contacts R41*a*, contacts R22*a*, now closed, relay coils R49, R52 and line 201. The motor M will now keep running and cards will be fed as long as they are present or until a stop key is depressed. Depression of the stop key will complete a circuit from line 200, wire 204, the stop key, the pick coil of relay R41, wire 205 and line 201. The energization of relay R41 would open the contacts R41*a* to drop out relay R49 and thereby stop the machine.

*Third cycle*

The third cycle is utilized to read the control number punched in the first master card, using the reading to condition the group control comparing circuitry to ascertain if the master card read is the first card of a group. If an unequal comparison results between readings taken between the first and second reading brushes 15 and 16, then the card read at the first reading brushes 15 is the first card of a new group and selector circuits are set up to cause the data punched on the first card to be reproduced in a detail card during the fourth cycle. Also, the unequal comparison causes delay circuits to be set up to effect the automatic reproduction of the second master card of the group during the fifth cycle.

The control number on the first master card is sensed at the first reading station and a circuit is completed from line 200 (Fig. 2*b*), cam contacts C8, closed during each index position on the card, cam contacts R1, common brush 214, contact roll 215, the hole in the card, first reading brush 15, plug hubs 216, plug wire 217, entry plug hub 218 of the group control device, the pick coil of relay R26 and line 201. A hold circuit for relay R26 extends from line 200, cam contacts C25, contacts R26*a*, now closed, the hold coil of relay R26, wire 219 and line 201. The group control relays R26 and R27 are used in connection with any two digit control number read at the first reading brushes 15 and group control relays R28 and R29 are used in connection with any two digit control number read at the second reading brushes 16.

In the upper left-hand corner of Fig. 2*b* there is shown the group control comparing circuitry. Since a master card has not as yet been presented to the second reading brushes 16, there is an unequal comparison and the energization of relay R26 completes a test pulse circuit which extends from line 200, cam contacts C37, the normally open side of contacts R26*a*, now transferred, the normally closed side of contacts R28*b*, the group control exit plug hub 220, a plug wire connection 221, the X PU plug hub, the first pick coil of selector relay R164 and line 201. A circuit also extends from group control exit hub 222, plug wire 223, delay entry plug hub, the pick coil of delay relay R133 and line 201. Relay R133 will hold until 9.8 time of the fourth cycle by a circuit which extends from line 200, cam contacts R1–3, contacts R133*a*, now closed, the hold coil of relay R133 and line 201.

The energization of selector relay R164 transfers contacts R164*a* (Fig. 2*a*) and at 13.4 time in the third cycle a circuit is completed from line 200, cam contacts C1, contacts R49*a*, now closed, contacts R14*d*, now closed, PCH FD plug hub 224, plug wire connection to the C hub of the selector, the normally open side of selector contacts R164*a*, now transferred, the T plug hub of the selector and plug wire connection to PCH FD plug hub 225, the punch clutch magnets PCM and line 201. As a result the punch feed unit will operate during the fourth cycle to carry out the reproducing of the first master card.

*Fourth cycle*

The fourth cycle is used to reproduce the first master card into a detail card, to compare the control number on the first master card against the control number on a second master card and, in the case of an equal comparison, to set up delay circuitry for automatically reproducing the second master card during the fifth cycle.

It will be remembered that circuits were described to show that after the second cycle the read feed clutch magnets RMC1 and RMC2 are operated every cycle to continuously feed master cards. During the fourth cycle then, the first master card passes the second reading brushes 16 and the data thereon is reproduced into the second detail card which is now passing beneath the punches 18. The reproducing circuit extends from line 200, cam contacts C8, wire 226, cam contacts R2, common brush 227, contact roll 228, the holes in the card, second reading brushes 16, plug hubs 229, plug wire connections 230 to punch direct plug hubs 231, the punch magnets PM and line 201. The control number on the first master card is again directed into the group control device, this time entering the other half of the device and energizing, for example, relay R28 through a plug wire connection 232 extending between plug hub 229 and group control entry hub 233. Relay R28 holds through the contacts R28*a* and cam contacts C25.

As the first master card is being reproduced, the second master card is passing the first reading brushes 15 and the control number thereon is entered into the first half of the group control device, in a manner previously described, to energize group control relay R26. With relays R26 and R28 concurrently energized it can be seen that the test impulse through cam contacts C37 cannot get through to the exit hub to energize the selector relay R164 because the contacts R26*b* and R28*b* are both transferred. This indicates that the first two master cards have equal control numbers and hence belong to the same group.

It will be remembered that the selector relay R164 was energized at 13.0 time in the third cycle as a result of an unequal comparison. At that time a hold circuit was established for relay R164 which extendsd from line 200 (Fig. 2*b*), wire 233, cam contacts C4, closed contacts R164*d*, relay R164 and line 201. The circuit just described endeavors to hold relay R164 until 9.8 time in the fourth cycle. At 11.5 time in the fourth cycle a circuit is completed from line 200, cam contacts C3, contacts R5*c*, now closed, plug hub 234 and plug wire connection 235 to the drop-out plug hub, the pick coil of drop-out relay R165 and line 201. Relay R165 holds until 13.6 time in the fourth cycle through a circuit which extends from line 200, cam contacts C22, contacts R165*a*, now closed, the hold coil of relay R165 and line 201. Now, at 9.5 time in the fourth cycle a circuit is completed from line 200, cam contacts C19, contacts R165*b*, now closed, the transfer coil of relay R164 and line 201. The energization of the transfer coil transfers selector contacts R164*a* back to normal to drop out the selector.

In order to reproduce the second master card it is necessay to again energize the selector relay R164 using some means other than the group control comparing relays if the second master card does not produce an unequal impulse. This is accomplished by taking the unequal impulse that occurred during the third cycle and directing the impulse to condition certain delay circuits so that reproducing will automatically take place during the fifth cycle when the second master card is passing the second reading brushes 16.

It will be remembered that the unequal impulse in the third cycle caused the energization of relay R133, said relay holding until 9.8 time in the fourth cycle. At 8.6 time in the fourth cycle a circuit is completed from line 200, cam contacts R1–4, contacts R133*b*, now closed, the pick coil of relay R134 and line 201. Relay R134 holds until 0.5 time in the fifth cycle by a circuit which extends from line 200 (Fig. 2*b*), cam contacts C16, contacts R134*a*, now closed, the hold coil of relay R134, wire 219 and line 201. At 13.0 time in the fourth cycle a circuit is completed from line 200, cam contacts C17, contacts R134*b*, now closed, the delay exit plug hub, plug wire connection 236 to the D PU plug hub, the second pick coil of selector relay R164 and line 201.

This second energization of the selector relay R164 again transfers contacts R164*a* (Fig. 2*a*) and at 13.4 time in the fourth cycle the punch magnet circuit is completed from line 200, cam contacts C1, contacts R49*a*, now closed, contacts R14*d*, now closed, PCH FD plug hub 224, plug wire connection to the C hub of the selector, the normally open side of the selector contacts R164*a*, now transferred, the T plug hub of the selector and plug wire connection to PCH FD plug hub 225, the punch clutch magnets PCM and line 201. As a result the punch feed unit will operate during the fifth cycle to carry out the reproducing of the second master card.

*Fifth cycle*

During the fifth cycle the data on the second master card is reproduced on the third detail card which is passing beneath the punches 18. Also, the third master card enters the first reading brushes and compares with the second master card at the second reading brushes 16. Since the master cards belong to the same group, the control numbers compare equal and there will be no circuit from the group control exit hub to pick either the selector relay R164 or delay relay R133. Consequently, during the remaining cycles the punch feed will remain idle and no further reproducing will take place until a new control group is encountered and an unequal comparison results. If it should be desired to reproduce only the first master card of each group instead of both the first and second cards, this can be accomplished merely by removing the plug wire connection 223. Should it be desired to selectively reproduce only the second master card of each group the plug wire connection 223 is left in and plug wire connection 221 is removed.

While there have been shown and described and pointed out the fundamental novel features of the invention as applied to a preferred embodiment, it will be understood that various omissions and substitutions and changes in the form and details of the device illustrated and its operation may be made by those skilled in the art, without departing from the spirit of the invention. It is the intention, therefore, to be limited only as indicated by the scope of the following claims.

What is claimed is:

1. In a machine of the class described, the combination of a punching means, means for feeding groups of master cards bearing like classification data, means for feeding detail cards past said punching means, a master card analyzing means, a supplemental master card analyzing means, said master card feeding means feeding said master cards successively past said first analyzing means and said supplemental analyzing means synchronously with the feeding of a detail card past said punching means, comparing means controlled by the aforesaid master card analyzing means, operating means under control of said comparing means for effecting upon disagreement in clasification data of master cards successive operation of said detail card feeding means, means under control of said supplemental master card analyzing means for conditioning said punching means, and means controlled by the operation of said detail card feeding means for operating said punching means to transfer data from the first and second master cards of a group to detail cards.

2. In a machine of the class described, the combination of a punching means, means for feeding groups of master cards bearing like classification data, means for feeding detail cards past said punching means, a master card analyzing means, a supplemental master card analyzing means, said master card feeding means feeding said master cards successively past said first analyzing means and said supplemental analyzing means synchronously with the feeding of a detail card past said punching means, comparing means controlled by the aforesaid master card analyzing means, switching means operated under control of said comparing means for effecting upon disagreement in classification data of master cards an operation of said detail card feeding means, means under control of said supplemental master card analyzing means for conditioning said punching means, means controlled by the operation of said detail card feeding means for operating said punching means to transfer data from the first master card of a group to a detail card, means for restoring said switching means, and control means under control of said comparing means for effecting as a result of said disagreement in classification data of master cards a second operation of said switching means to again operate said detail card feeding means, said detail card feeding means operating said punching means to transfer data from the second master card of said group to a detail card.

3. A machine as in claim 2 having means for selectively placing the operation of said switching means under control of the comparing means alone in order to reproduce only the first master card of each group, and means for selectively placing the switching means under control of said control means alone in order to reproduce only the second master card of each group.

4. In a cyclically operable machine of the class described, the combination of a punching means, means for feeding groups of master cards bearing like classification data, means for feeding detail cards past said punching means, a master card analyzing means, a supplemental master card analyzing means, said master card feeding means feeding said master cards successively past said first analyzing means and said supplemental analyzing means synchronously with the feeding of a detail card past said punching means, comparing means controlled by the aforesaid master card analyzing means, switching means operated under control of said comparing means during a reading cycle of the machine for effecting upon disagreement in classification data of master cards the operation one cycle later of said detail card feeding means, means under control of said supplemental master card analyzing means for conditioning said punching means, means controlled by the operation of said detail card feeding means for operating said punching means to transfer data from the first master card of a group to a detail card, means to restore said switching means, and control means under control of said comparing means during said reading cycle for effecting as a result of said disagreement in classification data of master cards a second operation of said switching means to operate said detail card feeding means two cycles after said reading cycle, said detail card feeding means operating said punching means to transfer data from the second master card of said group to a detail card.

5. In a cyclically operable machine of the class described, the combination of a punching means, means for feeding groups of master cards bearing like classification data, means for feeding detail cards past said punching means, a master card analyzing means, a supplemental master card analyzing means, said master card feeding means feeding said master cards successively past said first analyzing means and said supplemental analyzing means synchronously with the feeding of a detail card past said punching means, comparing means controlled by the aforesaid master card analyzing means, switching means for effecting operation of said detail card feeding means, means under control of said supplemental master card analyzing means for conditioning said punching means, control means under control of said comparing means and operable during a reading cycle of the machine upon disagreement in classification data of master cards, delay means operated by said control means for operating said switching means one cycle after said reading cycle, and means controlled by said detail card feeding means for operating said punching means two cycles after said reading cycle to transfer data from the second master card of a group to a detail card.

References Cited in the file of this patent

UNITED STATES PATENTS 2,372,909 Page et al. -------------- Apr. 3, 1945